United States Patent [19]

Bergström et al.

[11] 4,440,495
[45] Apr. 3, 1984

[54] APPARATUS AND THE USE THEREOF FOR CHECKING THE ALIGNMENT OF WHEEL AXLES

[75] Inventors: Hans R. Bergström; Rolf Malmborg, both of Kungsör, Sweden

[73] Assignee: Aktiebolaget SAMEFA, Kungsoer, Sweden

[21] Appl. No.: 195,458

[22] Filed: Oct. 9, 1980

[30] Foreign Application Priority Data

Oct. 12, 1979 [SE] Sweden .............................. 7908488

[51] Int. Cl.³ .............................................. G01C 1/00
[52] U.S. Cl. ..................................... 356/155; 33/288; 356/153
[58] Field of Search ............... 356/148, 153, 154, 155; 33/203.18, 288

[56] References Cited

U.S. PATENT DOCUMENTS 4,115,926 9/1978 Hampton et al. ................... 356/155
4,135,823 1/1979 Horvallius ........................... 356/148

Primary Examiner—R. A. Rosenberger

Attorney, Agent, or Firm—Flynn, Thiel, Boutell & Tanis

[57] ABSTRACT

The invention relates to measuring apparatus and its use, primarily for checking vehicle wheels, and more specifically the alignment of the rotational axes thereof. Two wheels, opposite each other on a vehicle, are provided with projecting stub axles which are disposed accurately coaxial with the respective wheel. The measuring apparatus comprises a scale unit (40) which is mounted on the axle of one of the wheels by means of a locating and fastening means (46, 48) so as to project at right angles therefrom and carrying a movable rider (50) with a scale (55), and a light beam unit (60) preferably comprising a laser (65) and disposed for mounting on the axle of the other wheel, by means of a locating and fastening means (66, 67), to send a light beam (33) onto the scale (55) carried by the movable rider (50) which is locked in an initial position. The measurements are carried out by the units (40, 60) being swung around the centers of the stub axles to different positions and possible movements of the point of incidence of the beam (33) on the scale (55) are observed.

6 Claims, 10 Drawing Figures

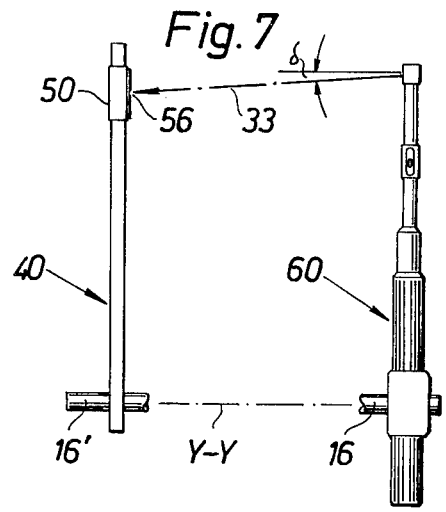
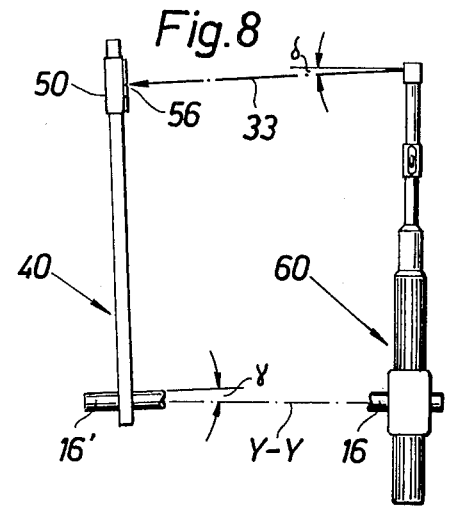
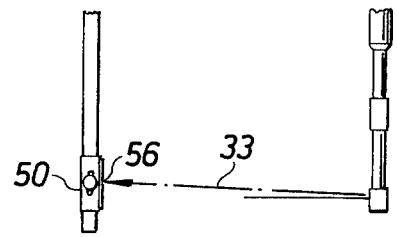
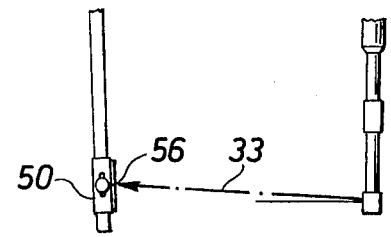
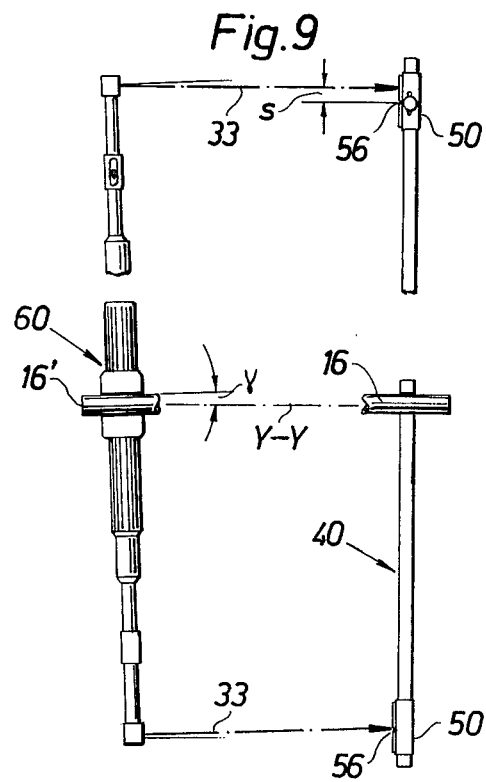
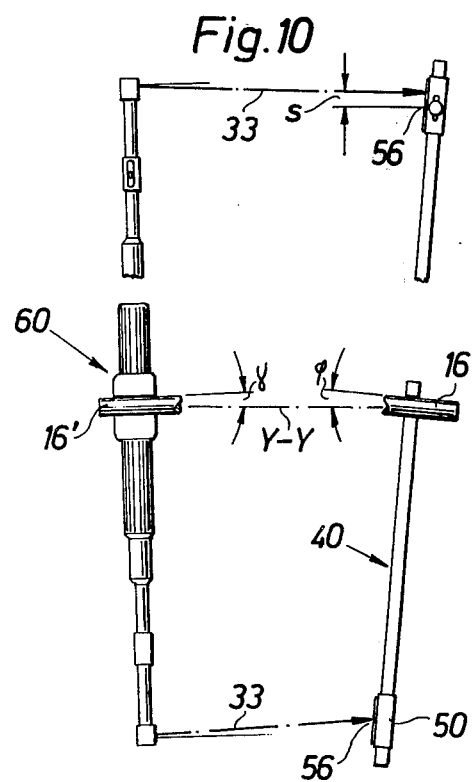

APPARATUS AND THE USE THEREOF FOR CHECKING THE ALIGNMENT OF WHEEL AXLES

The present invention relates to an apparatus for checking the alignment of wheel axis, primarily in vehicles.

Adjusting and checking the setting of the alignment of the rotational axes of a pair of wheels on a vehicle is a known problem in the art, or more specifically, checking that the rotational axis of one wheel (a wheel in this context being a single wheel or two wheels together) on one side of the vehicle is either exactly coaxial with, or is inclined in a given mode in relation to the rotational axis of the corresponding wheel on the other side of the vehicle. For obvious reasons it is impossible to directly compare the directions of both axes of rotation, and more or less sophisticated measuring methods and instruments are used to determine the position and direction of the rotational axes in question.

A comparatively simple device is described in U.S. Pat. No. 4,135,823 for comparing the axial directions of a pair of wheels on a vehicle, the essentially of the apparatus residing in an optical prism with the capacity of deflecting or reflecting a light beam practically exactly at 90°, the error attaining at most half an angular minute. An optical prism of this kind is also described in Swedish Pat. No. 7508469-9.

The known apparatus constitutes an instrument for absolute measurement, i.e. it gives direct information as to possible errors in the wheel setting and absolute values of the error, after it has been fitted to the examined wheels as prescribed.

It has been found, however, that measuring apparatus of this kind can be considerably simplified and cheapened by it being arranged in accordance with the invention for carrying out relative, comparative measurements, enabling the inventive apparatus to be made without the extreme demands on accuracy required by the known apparatus, with consequent gain in respect of production costs.

The invention accordingly has the object of providing a measuring apparatus for checking the alignment of wheel axles, with the help of which the desired measuring and checking functions can be obtained with means which are considerably simplified, above all from the point of view of manufacture, in comparison with similar, previously known measuring apparatus. The object is achieved by the apparatus in accordance with the invention being given the characterizing features disclosed in patent claim 1.

For the purpose of exemplification, the invention will now be described with reference to the appended drawings on which FIG. 1 schematically illustrates the modus operandi for the measuring apparatus known already, and referred to in the introduction.

FIG. 4 illustrates a scale rider included in the apparatus according to the FIGS. 2 and 3, while

FIGS. 7–10, finally, illustrate schematically how both units coact for checking the directions of the axes of the wheels in a wheel pair in some different phases of measurement.

Figure 1:
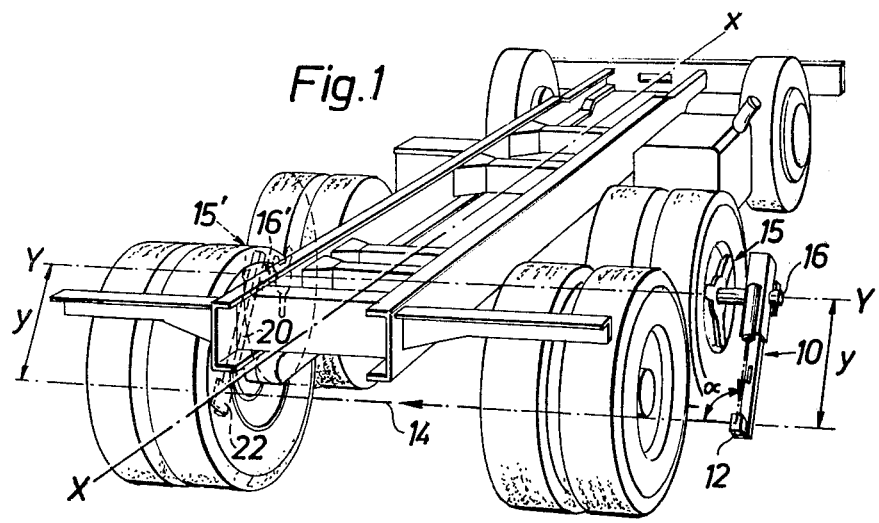

To clarify the background of the invention, the modus operandi for the earlier measuring equipment, e.g. that known from the mentioned U.S. Pat. No. 4,135,823, will be summarily described while referring to FIG. 1, which illustrates the chassis of a heavy vehicle, the central longitudinal axis of which is denoted by X—X. The measuring apparatus includes a laser unit 10 and a measuring bar, or so-called hub straight edge 20. On each of the wheels (in this case double wheels) in the wheel pair which is to be examined there is also mounted a so-called centering unit 15, preferably of the kind described in the U.S. Pat. No. 4,011,659, for example. This centering unit is of a nature such that a stub axle or pin 16 projecting out from the unit can be brought into practically absolute coaxiality with the rotational axis of the wheel by means of simple adjustment, this pin thus representing the rotational axis of the respective wheel in a pair. In the illustrated type of wheel suspension, both the rotational axes should coincide with line Y—Y between the centers of the wheels, but one skilled in the art will understand that in other cases the wheel setting can be such that both axes of rotation commonly incline somewhat, i.e. each axis is at a small angle to the line Y—Y.

As will be seen, the laser unit 10 is mounted on the centering pin 16 on one side, while the hub straight edge 20 is attached to the pin 16' of the centering unit mounted on the opposite side. At one end of the laser unit there is a deflecting prism 12 and at the corresponding place on the hub straight edge there is a fixed scale 22 with a central zero point. The laser unit emits a light beam which is accurately at right angles to the centering unit pin 16, and this beam is reflected in the deflecting prism 12 to strike the opposing scale 22, mounted on the hub straight edge. The arrangement is now such that if the distance y between the center of the pin 16 of the centering unit 15 on the laser side to the reflection point in the deflecting prism 12 is exactly as great as the distance y between the centre of the pin 16' of the opposite centering unit 15' to the zero point on the scale 22 of the hub straight edge 20, and if the deflection prism 12 furthermore has the property, mentioned in the introduction, of reflecting the laser beam by an angle $\alpha$ which is exactly 90°, the point of incidence of the beam on the scale 22 will obviously directly indicate if the wheel axis on the laser side, i.e. the centering pin 16, is somewhat inclined in relation to the line Y—Y of the wheel pair.

As already pointed out, this measuring apparatus requires great accuracy in its embodiment, especially the deflecting prism 12 included therein, but even both units per se require great accuracy in manufacture. To arrange their portions engaging with the pins 16 of the centering units such that the units will be directed exactly at right angles to the pins is not too demanding, but to adjust both units so that the above-defined distances y will be exactly alike is costly.

Figure 2:
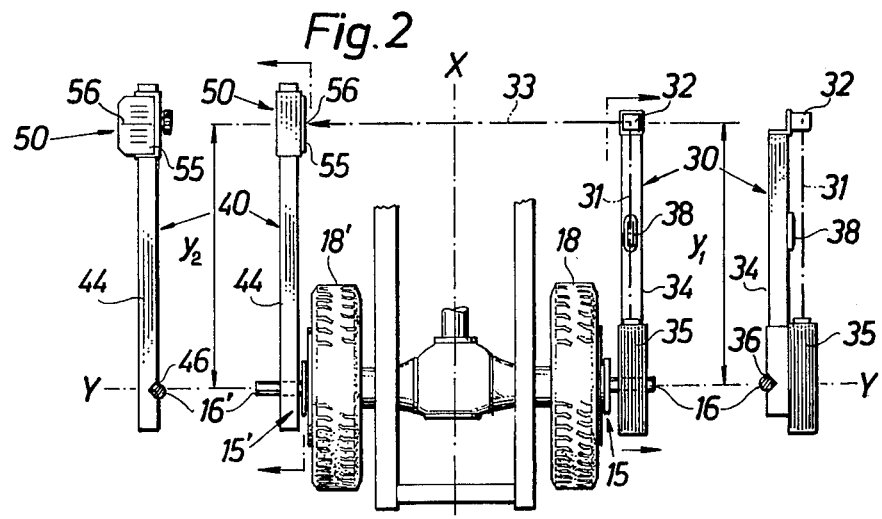
FIGS. 2 and 3 illustrate a measuring apparatus made in accordance with the invention and fitted to the rear wheels of a vehicle in two different positions for carrying out comparative measurements.
Figure 3:
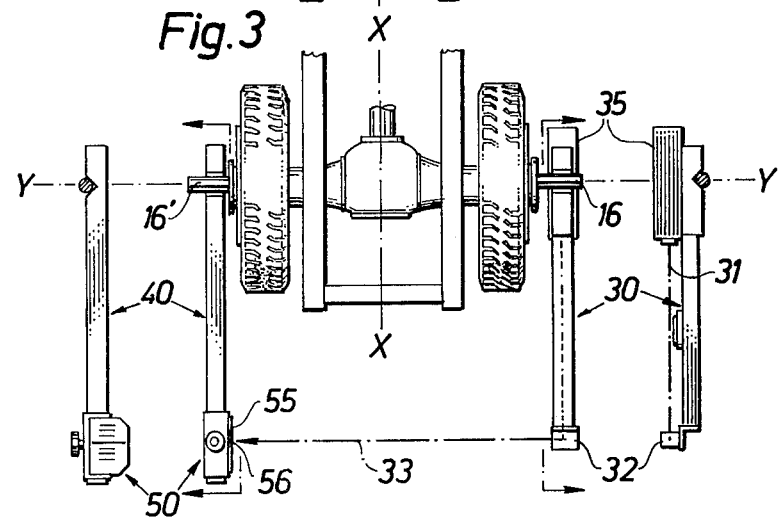

The apparatus in accordance with the invention is based on the condition that relative or comparative measurements can be made, and it will thus be possible to make the units included in the measuring apparatus considerably cheaper, thanks to the reduced requirements of accuracy set up in manufacture. FIGS. 2 and 3 illustrate the new measuring apparatus in two different measuring positions. It is assumed that measuring takes place on the rear wheels 18 and 18' of a vehicle, and as before, suitable centering units 15 and 15' with pins 16 and 16' have been fitted to the wheels, as illustrated in FIG. 2. A laser unit 30 includes a bar or holder 34, on one end of which there is mounted a laser beam generator 35, while an optical deviation or reflector unit 32 is mounted on the opposite end of the holder 34. The holder is provided with a locating means 36 arranged to coact with the pin 16 so that the unit can be clamped down onto the pin in a position at right angles thereto. For measurements in a horizontal position the laser unit is provided with an inclination indicator or level 38. In general, the laser unit 30 is thus in conformity with the laser unit 10, summarily described above, but there are no extreme demands on dimensional and fitting accuracy, as has already been pointed out and which will be explained in detail in the following.

Figure 4:
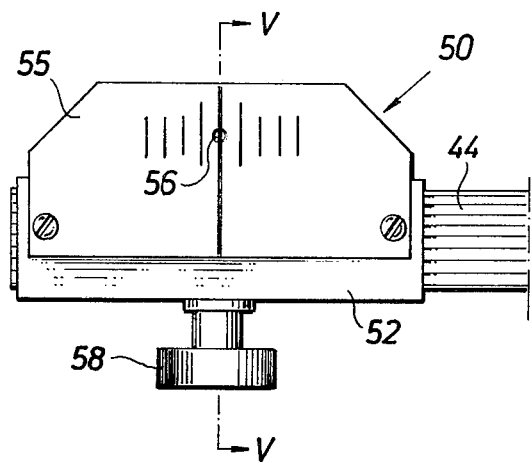
Figure 5:
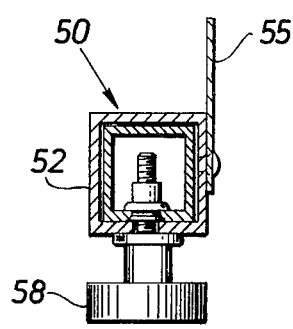
FIG. 5 is a section along the line V—V in FIG. 4.

On the opposite side, a hub straight edge 40 is attached to the pin 16' of the centering unit 15' there, the straight edge comprising a bar or holder 44 provided with a suitable locating means 46 for location on, and squaring up to the pin 16'. This hub straight edge is not provided with a fixed scale, however, but with a movable scale rider 50 shown in detail in FIG. 4, and including a sleeve 52 fitting on, and displaceable along the bar 44, which suitably constitutes a conventional light metal square tube. The sleeve 52 can be clamped to the bar by means of a set screw 58 and carries a scale plate 55 provided with a scale having a zero point 56.

With the aid of the apparatus in accordance with the invention a comparison of the direction of both wheel axes in relation to a centre connecting line Y—Y is carried out in the following way. The laser generator 35 sends a beam 31, which is reflected at an angle $\alpha = 90°$ in the deflecting prism 32, and the reflected ray 33 strikes the hub straight edge scale 55 on the rider 50. The deflecting point of the prism is assumed to be at a distance $y_1$, from the centre of the pin 16, while the zero point 56 of the scale 55 is assumed to be at a distance $y_2$ from the centre of the pin 16'.

Now, if both pins 16 and 16', which thus represent the rotational axes of both wheels, are exactly coaxial and if the angle $\alpha$ is exactly 90°, if the distance $y_1$ and $y_2$ are exactly equal and if the laser unit as well as the hub straight edge are aligned exactly at right angles to the respective centering pins, then in the situation to FIG. 2 the beam 33 will obviously strike the zero point 56 of the scale 55. However, if the components themselves as well as their alignment are made with moderate, and not extreme accuracy, it is probable that the point where the beam 33 strikes the scale 55 will lie to one side of the zero point 56. This applies especially if the angle of reflection $\alpha$ were to deviate somewhat from 90°.

However, the incidence of the beam 33 on the zero point 56 can be arranged by simply displacing the rider 50 somewhat, so that an initial position with the ray meeting the zero point is obtained. Then, if both units 30 and 40 are swung through 180° to the position illustrated in FIG. 3, the beam 33 will still meet the scale 55 at the zero point 56, for reasons which will easily be understood, provided that both pins 16 and 16' are coaxial.

On the other hand, if the pin 16 carrying the laser unit 30 were to slope somewhat in relation to the pin 16', the point of incidence of the beam will obviously move after the 180° turn, and this movement along the scale 55 constitutes a measure of the inclination of the pin 16, i.e. the wheel 18.

A new measurement is then carried out, this time with the units changed over, so that the laser unit 30 is attached to the opposite centering pin 16' and vice versa. The change-over is required by the fact that it is always the inclination of the pin on which the laser unit is mounted which is revealed by the measurements, as will be discussed more closely in the following, while referring to FIGS. 7–10. The described measurements, possibly supplemented by measurements in intermediate positions, give a complete picture of the alignment of the axes of rotation of both wheels.

Figure 6:
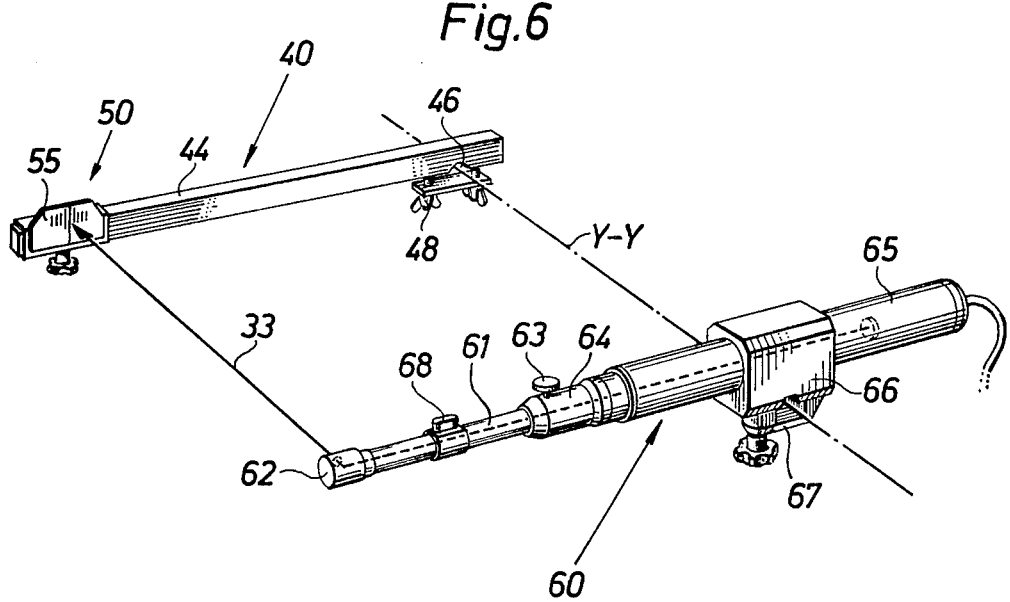
FIG. 6 is a schematic perspective view of two units included in the apparatus according to the invention, and their coaction, the units being illustrated completely exposed to view.

In FIG. 6 there is illustrated in perspective a practically suitable embodiment of both units included in the measuring apparatus in accordance with the invention, these units being shown completely exposed to view. The hub straight edge 40 is made as previously described, and thus comprising a holder or bar in the form of a square tube 44 provided with a locating means 46 for locating it on the centering pin, the straight edge being clamped to the pin by means of a suitable clamping means 48. At the other end of the bar 44 the scale rider 50, described above, is glidably and lockably accomodated.

In practice, the laser unit is suitably made more compact that is shown in FIGS. 2 and 3, and the laser unit 60 illustrated in FIG. 6 thus comprises a beam generator 65, the output end of which is provided with a fitting 64 arranged to receive an adaptor sleeve 61, which can be locked in a given position in the fitting by means of a set screw 63. At its outer end the adapter sleeve 61 carries a deflection or reflection means 62, which can be of an optional suitable type e.g. a conventional reflecting prism, a so-called pentagonal prism or a prism unit of the kind described in said Swedish Pat. No. 7508469-8. A level 68 is mounted on the sleeve 61, and the whole laser unit 60 is fixed to the associated centering pin by means of a locating means 66 with associated clamping means 67.

The practical use of the measuring apparatus in accordance with the invention will now be exemplified while referring to FIGS. 7–10, which schematically illustrate how the apparatus functions in some different measuring cases. It is first assumed (see FIG. 7) that the rotational axes for both wheels in a wheel pair are completely coaxial, which thus signifies that the pins 16 and 16' of the centering units, which have been fitted in place, are similarly completely coaxial, and have their central axes coinciding with the line Y—Y between the centers of the wheels. It is further assumed that the beam 33 reflected from the laser unit 60 is not reflected exactly at right angles to the longitudinal direction of the unit, the angle of reflection deviating by a small amount $\delta$ (say about 10 angular minutes) from 90°, as has been indicated greatly exaggerated in FIG. 7. If the rider 50 is adjusted so that the beam 33 strikes the zero point 56 on the scale associated with the slide, the beam will still strike the zero point if the units 40 and 60 are swung through 180°, as illustrated towards the bottom in FIG. 7, since the pins 16 and 16' are completely coaxial.

If it is now assumed that the left-hand wheel (according to the Figures) on which the hub straight edge 40 is situated is somewhat out of true, specifically so that its rotational axis forms a small angle $\gamma$ with the line Y—Y between the wheel centers, see FIG. 8, the relationships will practically not change at all. The angle $\gamma$ is very small anyway, which signifies that the scale on the rider 50 will have moved a trifle practically in line with the beam 33, which in turn signifies that any movement of its point of incidence on the scale will not be able to be observed. It is thus assumed here, as shown in FIG. 8, that the right-hand wheel is still in the right attitude, i.e. its rotational axis coincides with the line Y—Y.

The conditions will be quite different if the hub straight edge and laser unit change places, as shown in FIG. 9. Although it can be very small, as mentioned, the skew $\gamma$ of the pin 16' involves a large sweep of the beam 33 and if, as is shown towards the bottom of FIG. 9 in this case, the rider 50 is displaced so that the beam strikes the scale on the rider at the zero point 56 and the system is then swung through 180° (see the upper part of FIG. 9) the point of incidence of the beam will be displaced a distance s along the scale. With knowledge of the distance between the units and their geometric dimensions, calibration tables can easily be made up so that a measure of the skew $\gamma$ can be obtained.

From the above it will thus be seen that measurements with the apparatus in accordance with the invention determine the skew of the rotational axis of the wheel on which the laser unit is mounted. As was pointed out in conjunction with the description of FIG. 8, it cannot be observed whether or not the centering pin 16 or 16' on which the hub straight edge is fitted is on the skew. If it is assumed that the situation according to FIG. 9 is varied so that the rotational axis of the right-hand wheel is also on the skew, e.g. at the angle $\phi$, which is illustrated in FIG. 10, the laser beam 33 will still give a sweep s on the scale of the rider 50. In order to determine the size of the angle $\phi$ the units must once again change place, so that the laser unit is attached to the right-hand centering pin 16, and the sweep of the laser beam will now be caused by the angle $\phi$, which can be determined on the hub straight edge 40 attached to the centering pin 16'.

A series of accurate measurements and checks can be carried out in this mode on a vehicle without any dismantling or operations on the vehicle. The components incorporated in the measuring apparatus in accordance with the invention can easily and rapidly be coupled to the wheels of the vehicle, and the necessary series of measurements can be carried out quickly and simply in the field, which ought to be apparent from the previous description.

As has already been pointed out, it is not always the situation that the rotational axes of the wheels in a wheel pair shall coincide, and they can be intentionally arranged to form a certain angle in relation to each other and the geometrical axes of the vehicle (toe-in, toe-out etc.), and all such configurations can be checked with the aid of the measuring of the apparatus in accordance with the invention.

We claim:

1. In an apparatus for checking and determining the alignment of wheel axes, preferably the axes of two substantially coaxially arranged wheels (a wheel in this context being a single wheel or two wheels together) forming a wheel pair, said apparatus comprising two measuring units in the form of elongate elements each adapted for attachment to an axle of a wheel in a pair of wheels, so that said elements extend substantially at right angles and in the same direction out from the respective axle, one unit comprising a scale unit having a scale situated at a given distance ($y_2$) from the coacting axle, while the other unit is a beaming unit comprising a ray or beam emitter for emitting a light beam, and a reflector means situated at substantially the same given distance ($y_1$) from the axle coacting with the beaming unit and adapted for reflecting the light beam substantially 90° in a direction towards said scale on the scale unit, the improvement comprising means for adapting to relative, as opposed to absolute, alignment measurement, including means mounting the scale for displacement along the scale unit and means for locking the scale in a selected position along the scale unit.

2. Apparatus as claimed in claim 1, including pins attached to the wheels, and coaxial with the rotational axis of the respective wheel for representing the axle to which that wheel is attached, the scale unit comprising a base member in the form of a noncircular light metal tube, which is provided with a locating means together with attachment means for fixing the scale unit to the pin of a said wheel, the improvement being further comprised in that the scale mounting means is a sleeve or rider displaceable on the base member of the scale unit and the scale locking means coacts between said sleeve and tube to lock the former in said selected position on the latter.

3. Apparatus as claimed in claim 2, wherein said tube and sleeve are of corresponding square cross-section with said sleeve sized to slidably and snugly telescope on said tube adjacent the end thereof remote from said locating means, said locking means comprising a set screw cooperative with said tube and sleeve to releasably lock same together against relative axial movement.

4. Apparatus as claimed in claim 3, wherein said beaming unit comprises an elongate beam generator housing containing said beam emitter and having an output end for outputting said light beam therethrough, an elongate adaptor sleeve extending substantially coaxially from said output end of said elongate housing and received in a fitting thereon, said fitting having a set screw actuable for locking said sleeve in a given position with respect to said housing, said reflector means comprising prism means located in the free end portion of the sleeve to bend the light beam propogated along the interior of said housing and sleeve through substantially a right angle for leaving the sleeve free end portion substantially at right angles to the length of said sleeve, a level mounted on the sleeve, the intermediate portion of said housing being provided with a locating means and means including a set screw for fixing the latter with respect to the corresponding axle.

5. A method for determining and checking the alignment of the rotational axes of a vehicle's wheels, comprising the steps:

(a) providing a scale unit having a scale with a central zero point, said scale being displaceable along the scale unit, and a beaming unit with a ray or beam emitter and reflector means for right-angular deflection of the said beam onto the scale of the scale unit;

(b) selecting the wheels in pairs for examination, namely a wheel on one side of the vehicle and the wheel opposite thereto on the other side of the vehicle;

(c) providing said wheels with pins projecting therefrom and coaxial with the rotational axis of the respective wheel, in preparation for measurement;

(d) fixing the beaming unit momentarily in a given position on the pin of one wheel while the scale unit is fixed in a corresponding position on the pin of the opposite wheel, with the beaming unit in a position substantially parallel to that of the scale unit, so that its scale is struck by the beam of the beaming unit;

(e) displacing the scale along the scale unit to a position in which its zero point is struck by the beam;

(f) swinging both units about their axes to a new position in which they are substantially parallel;

(g) noting a possible shift of the point of incidence of the beam on the scale from the zero point of the latter, to discover how the alignment of the rotational axis of said one wheel carrying the beaming unit deviates from the direction of a line (Y—Y) between the centres of the wheels; and (h) interchanging said beaming unit and scale unit with respect to said wheels and repeating steps (d) through (g) to discover how the alignment of the rotational axis of said opposite wheel, now carrying the beaming unit, deviates from the direction of said line (Y—Y) between the centres of the wheels.

6. The method of claim 5, in which said step of swinging is through about 180°.

* * * * *